(12) United States Patent
Wu et al.

(10) Patent No.: US 8,700,967 B2
(45) Date of Patent: Apr. 15, 2014

(54) TRANSMITTER, RECEIVER, TRANSMISSION METHOD, AND RECEPTION METHOD

(75) Inventors: Jianming Wu, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1031 days.

(21) Appl. No.: 12/406,295

(22) Filed: Mar. 18, 2009

(65) Prior Publication Data
US 2009/0307559 A1 Dec. 10, 2009

(30) Foreign Application Priority Data
Jun. 6, 2008 (JP) .................................. 2008-149711

(51) Int. Cl.
*G06F 11/00* (2006.01)

(52) U.S. Cl.
USPC ............................................ 714/749; 714/748

(58) Field of Classification Search
CPC ... H04L 1/1812; H04L 1/1819; H04L 1/1867; H04L 1/1809; H04L 1/18; G06F 11/14
See application file for complete search history.

(56) References Cited

U.S. PATENT DOCUMENTS

| | | | |
|---|---|---|---|
| 6,631,127 B1* | 10/2003 | Ahmed et al. ................ | 370/349 |
| 2003/0126551 A1* | 7/2003 | Mantha et al. ................ | 714/790 |
| 2006/0150050 A1* | 7/2006 | Choi et al. .................... | 714/748 |
| 2006/0291440 A1 | 12/2006 | Hausl et al. | |
| 2007/0253423 A1* | 11/2007 | Chindapol et al. ........... | 370/394 |
| 2008/0294959 A1* | 11/2008 | Chindapol et al. ........... | 714/752 |

FOREIGN PATENT DOCUMENTS

| | | |
|---|---|---|
| JP | 2000-224226 | 8/2000 |
| JP | 2006-352855 | 12/2006 |
| JP | 2007-006231 | 1/2007 |
| JP | 2007-129673 | 5/2007 |
| WO | 2006/071187 | 7/2006 |

OTHER PUBLICATIONS

S. Lin, et al. "Error Control Coding, Fundamentals and Applications" Chapter 15 (pp. 458-495), Published by Prentice-Hall, Inc., Englewood Cliffs, New Jersey, USA; Dated: 1983.
3GPP TR 25.848 V4.0.0; 3rd Generation Partnership Project; Technical Specification Group Radio Access Network; "Physical layer aspects of UTRA High Speed Downlink Packet Access" (Release 4); Mar. 2001.
J. Wu, et al. "Non-Complete Puncture Based Re-Transmission for HARQ" C50-20011105-025, 3GPP2 TSG-C Working Group 5; Dated: Nov. 5, 2001.
J. Wu, et al. "Simulation Study on NCP-HARQ" C50-20011203-022, 3GPP2 TSG-C Working Group 5; Dated: Dec. 3, 2001.
L. Xiao, et al. "Nested Codes with Multiple Interpretations" Dated: ISS 2006 40th.
European Search Report with European search opinion issued for corresponding European Patent Application No. 09156143.1 dated Feb. 29, 2012.
Notification of Reasons for Refusal issued for corresponding Japanese Patent Application No. 2008-149711, dated Aug. 9, 2012, with partial English translation.

* cited by examiner

*Primary Examiner* — Scott Baderman
*Assistant Examiner* — Jason Bryan
(74) *Attorney, Agent, or Firm* — Myers Wolin, LLC

(57) ABSTRACT

A predetermined logical operation is performed to unsent data which is sent toward the receiver 50 and to retransmission data which is resent toward the receiver, and the transmission data obtained by the logical operation is sent to the receiver.

9 Claims, 12 Drawing Sheets

TRANSMITTER, RECEIVER, TRANSMISSION METHOD, AND RECEPTION METHOD

CROSS REFERENCE TO RELATED APPLICATION(S)

This application is based upon and claims the benefit of priority of the prior Japanese Patent Application No. 2008-149711, filed on Jun. 6, 2008, the entire contents of which are incorporated herein by reference.

FIELD

The present proposition relates to a transmitter, a receiver, a transmission method, and a reception method. The present proposition can be employed in a radio communications system in which the transmitter retransmits data to the receiver in accordance with a reception error notification from the receiver.

BACKGROUND

In the field of radio communications, Automatic-Repeat-Request (ARQ) is known as one of the coding techniques. ARQ is used together with an error detection technique such as Cyclic Redundancy Check (CRC).

In a case where an error is detected by CRC, the receiver notifies the transmitter of failure in reception of packet data (hereafter, will be also called "data packet" or simply, "packet") sent by the transmitter through a control channel. When receiving this notification, the transmitter continues retransmission of a packet relating to the above mentioned transmission packet until the receiver succeeds in receiving the packet data.

As leading ARQ schemes, the following three types of schemes are known: stop-and-wait ARQ, go-back-N ARQ; and selective-repeat ARQ. In these scheme, it can occur that the throughput abruptly lowers as a channel error rate incases. Thus, hybrid ARQ (HARQ), in which ARQ is in combination with forward-error control (FEC), is also proposed.

HARQ is one of the indirect link adaptation techniques and is generally used in a physical layer. In HARQ, two types of schemes are known as leading schemes, a scheme called "chase combining (CC)", and a scheme called "incremental redundancy (IR)".

In the CC scheme, the transmitter retransmits the same packet as the transmission (coded) packet whose reception by the receiver has been failed. The decoder of the receiver combines the transmission packet failed in its reception with the retransmitted packet by weighting based on, for example, the reception SNR (Signal-to-Noise Ratio). Therefore, the CC scheme makes it possible to obtain a diversity gain in the time domain.

On the other hand, the IR scheme does not retransmit all the redundant information (parity bit) included in a coded packet, as is performed in the CC scheme. Instead, the IR scheme performs retransmission sequentially while increasing a transmission part of the parity bit every when decoding fails.

Further, as to HARQ scheme, HARQ which is called the N-channel stop-and-wait scheme is also proposed to reduce the buffer amount required in the receiver. As this scheme, the unsynchronized HARQ scheme and the synchronized HARQ scheme are known.

The N channel is a logical channel (hereinafter, will be also called the "HARQ channel"). In the unsynchronized HARQ scheme, the N channel can be identified by the number of the sub-channel which is definitely assigned. On the other hand, in the synchronized HARQ scheme, the N channel can be identified with, for example, predetermined sub-frame timing (time slot).

[Non-patent Document 1] S. Lin and D. J. Costello, JR, Error Control Coding, Fundamentals and Application, Prentice-Hall, Inc, Englewood Cliffs, N.J., 1983.

[Non-patent Document 2] 3GPP TR 25.848 V4. 0. 0, March 2001.

[Non-patent Document 3] J. Wu, W. Tong, and J. Li, "Non-complete puncture based re-transmission for HARQ", C50-20011105-025, 3GPP2 TSG-C WG5, Nov. 5, 2001.

[Non-patent Document 4] J. Wu, W. Tong, and J. Li, "Simulation Study on NCP-HARQ", C50-20011203-022, 3GPP2 TSG-C WG5, Dec. 3, 2001.

[Non-patent Document 5] Xiao, L.; Fuja, T. E.; Kliewer, J.; Costello, D. J. Jr. "Nested Coded with Multiple Interpretations", ISS 2006 40th, 22-24 Mar. 2006.

FIG. 11 illustrates an example of HARQ processing based on the synchronized N-channel stop-and-wait scheme in a case where N=4. FIG. 11 exemplifies a manner in which four packets #1 through #4 are sent in the time of 4TTI by use of four parallel HARQ channels.

Each packet is sent without waiting for transmission of other packets as far as a packet to be sent is present so that the HARQ channel is occupied by transmission packets throughout the time. In the present example, the positions at which retransmission occurs are limited to the positions expressed by, for example, $m+k \cdot N$ (m is the number of the HARQ channel of the retransmission packet to which an attention is paid; k is a positive integer). Accordingly, if this HARQ channel is assigned to another user (UE), there is a possibility that retransmission is delayed.

The N-channel stop-and-wait HARQ scheme is suitable for a lot of standards such as 3GPP2, 3GPP, and IEEE802.16, and it leaves much to be improved in circumstances such as that in which UE moves in low velocity.

That is, in a case where UE moves in low velocity, it is not always necessary to send a normal packet that is requested to be retransmitted in HARQ retransmission. To send a normal packet, in spite of the above fact, leads to unnecessary redundant transmission, so that it can cause a waste of a lot of channel resources.

FIG. 12 illustrates an example of a relationship between mutual (cooperative) Information (MI) and SINR (Signal-to-Interference and Noise Ratio) per symbol.

As exemplified in FIG. 12, SINR necessary in HARQ transmission can be significantly smaller than SINR in a case where a normal packet is sent. The operation point of HARQ is generally set to a Block Error Rate (BLER) of 10%.

Therefore, in a case where UE is under circumstances in which fading variation is not much, the energy necessary for restoring a packet can be small. When this energy is converted in terms of the SNR standard, it can be smaller than 1 dB in its average value.

From such a point of view, a proposition called "NCP" (Non-complete Puncture) based HARQ made for the 1×EV-DV (1× Evolution-Data and Voice) standard in the year of 2001 is publicized. This proposition mainly relates to reduction of the waste of channel resources in HARQ process.

In this NCP retransmission scheme, retransmission packets are dispersed to multiple new packets and punctured so that the retransmission packet occupies a small part of the payload of the new packets. As a result, it becomes possible to significantly increase the throughput of the whole. In this instance, on the receiver, a retransmission packet and a new packet are decoded separately.

Further, recently, the nested coding scheme employing multiple interpretations is proposed. According to this scheme, the multiple packets are coded separately, and each of the thus coded packets is sent out after being subjected to an operation of exclusive OR (XOR) in a physical layer.

However, the above described previous techniques remain at the capability that a retransmission packet is included in the payload of multiple new packets or that an XOR operation of individual packets is performed.

SUMMARY

For example, the following means are used.

(1) As a generic feature, there provided is a transmitter, comprising: a logical operation unit to perform a predetermined logical operation to unsent transmission data, which is sent toward a receiver, and retransmission data, which is resent toward the receiver; and a transmitter unit to send transmission data obtained by the logical operation to the receiver.

(2) As another generic feature, there provided is a receiver, comprising: a receiver unit to receive data sent toward the receiver, which data is subjected to predetermined logical operations performed on unsent data sent toward the receiver and on retransmission data resent toward the receiver; a retransmission data processor to detect a retransmission data component by performing a first operation corresponding to the logical operation on the reception data received by the receiver unit and on unsent data received in past, and to demodulate and decode the retransmission data; and an unsent data processor to detect unsent transmission data by performing a second operation corresponding to the logical operation on the reception data received by the receiver unit and on retransmission data detected by the retransmission data processor, and to demodulate and decode the unsent data.

(3) As yet another generic feature, there provided is a transmission method, comprising: performing a predetermined logical operation to unsent transmission data, which is sent toward a receiver, and a retransmission data, which is resent toward the receiver; and sending transmission data obtained by the logical operation to the receiver.

(4) As still another generic feature, there provided is a reception method, comprising: receiving data sent toward the receiver, which data is subjected to predetermined logical operations performed on unsent data sent toward the receiver and on retransmission data resent toward the receiver; detecting a retransmission data component by performing a first operation corresponding to the logical operation on the reception data received by the receiver unit and on unsent data received in past, and demodulating and decoding the retransmission data; and detecting an unsent transmission data component by performing a second operation corresponding to the logical operation on the reception data and on the retransmission data component having been detected, and to demodulate and decode the unsent data.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Figure 1:
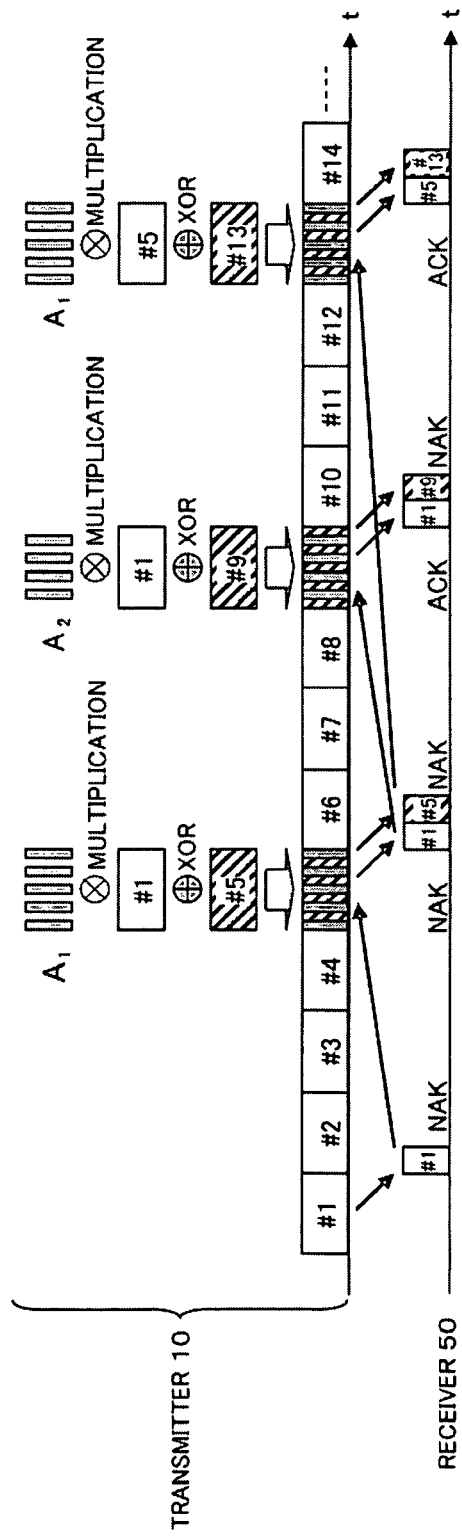
FIG. 1 is a diagram illustrating an example of a synchronization flow of HARQ by cooperative coding according to one embodiment.

Referring to the drawings, a description will be made hereinafter of one preferred embodiment of the present invention. Here, the embodiment described below is merely an example, and there is no intention to exclude application of various types of modifications or techniques not explicitly described in the following descriptions. That is, the present embodiment should by no means be limited to the illustrated embodiment below, and various changes or modifications (combination of practical examples, or the like) may be suggested without departing from the gist of the invention.

[1] One Embodiment:

The present embodiment will propose a new HARQ scheme which realizes XOR operation based coding, and is in harmony with HARQ, and is capable of significantly improving a throughput.

The proposed HARQ process includes the following three processes at a predetermined repetition cycle.

In a first process, if a data packet (hereinafter, will be simply called "packet") is not correctly received by a receiver at initial transmission, a transmitter attempts retransmission of the data packet. This retransmission packet can be obtained by an XOR operation of a part of or all of the new packets, which XOR operation is performed in accordance with a predetermined pattern.

In a second process, a new portion of the packet is decoded using de-XOR with stored failed packet in the receiver buffer.

In the second process, the receiver decodes a coded packet received based on packet information in which any error occurs, which packet has already been decoded by use of a certain number of symbols correct in hard level.

In a third process, the retransmission packet is generally or partially combined (XOR operation) with a packet (unsent packet) to be newly sent, in accordance with already known packet information, regardless of a ratio of the valid symbols contained therein. The combined retransmission part (symbols or bits) is combined with a proceeding reception failure packet, which has been stored, to improve a retransmission gain with continuation of decoding processing.

In this instance, the above described transmitter, as an example, can be used as a transmission system of the entity of a radio access network (RAN) or as a transmission system of user equipment (UE). On the other hand, the receiver, as an example, can be used in the reception system of UE and the reception system of the entity of RAN.

An example of the entity of RAN is a radio base station such as a base station (BS), a Node B, and an eNB (evolved Node B). An example of UE is a mobile station such as a mobile telephone and an information terminal with a radio interface equivalent to that of a mobile telephone added thereto. Thus, UE includes an apparatus that is capable of transceiving sound or data or both of those with coupling to RAN. In addition, UE can be a fixedly installed radio device (mobile device or terminal).

[2] HARQ Scheme with Cooperative Coding (Cooperative Coding Based HARQ)

In the beginning, for giving a clear definition of the HARQ scheme with cooperative coding, several parameters are defined. The principle of the HARQ scheme proposed here, will be clearly understood in its technical view by use of several examples which will be described hereafter. Further, that the proposed HARQ scheme is applicable to both of the CC scheme and the IR scheme will be clarified later.

(2.1) Definition of Parameters

Before making a detailed description of the HARQ of the present example, the definitions of several parameters which will be used throughout the present embodiment. The definitions are as follows.

a) k: index of transmission data packet b) i: index of transmission; in a case where i=0, i indicates a data packet belonging to an initial transmission, otherwise i indicates a data packet belonging to retransmission c) n: the number of a symbol in each data packet d) N: the number of symbols in each data packet e) sk, i(n): the n-th transmission symbol of the data packet sent at the k-th opportunity in the i-th transmission; here, n=0, 1, ..., N-1 f) Sk, i: vector of a symbol sent at the k-th opportunity in the i-th transmission; it is expressed by the following formula (1)

$$S_{k,i} = (S_{k,i}(0) S_{k,i}(1) \ldots S_{k,i}(N-1))^T \quad (1)$$

where $B^T$ indicates an invert of B.

g) Ai: an N×N diagonal matrix; this diagonal matrix is used for selecting an HARQ symbol in the i-th transmission in the process of HARQ sequence in the process of an HARQ sequence. For example, it is expressed by the following formula (2).

$$A_i = \begin{pmatrix} a_i(0) & 0 & \ldots & 0 \\ 0 & a_i(1) & \ldots & 0 \\ \vdots & \vdots & \ddots & \vdots \\ 0 & 0 & \ldots & a_i(N-1) \end{pmatrix} \quad (2)$$

where the value the entry ai (n) can take is 0 or 1; that is, ai(n)={1}.

h) mi, 0: the number of entries ai (n)=0 of a diaconal matrix Ai in the i-th transmission i) mi, 1: the number of entries ai (n(=1 of a diaconal matrix Ai in the i-th transmission; here, mi, 0+mi, 1=N j) γk. i: a remaining symbol error rate of a symbol vector Sk,i after decoding is performed k) Ck, i: a coding rate for the k-th normal packet in the i-th transmission (2.2) HARQ Transmission The HARQ with operative coding in the present example uses two types of transmission data packets. One is a normal data packet not including a retransmission packet component that is initially sent (also called a new packet) ; the other is a coded data packet including a component to which an XOR operation of a part or all of the retransmission packets to a normal packet is performed.

The normal data packet is sent in a case where no retransmission data is present in an HARQ buffer. In contrast to this, the coded data packet is sent in a case where a retransmission packet needs to be sent.

Hereafter, a detailed description will be made of a format example of a synchronized and an unsynchronized HARQ based coded data packet.

The HARQ scheme in the present example uses an HARQ scheduler which copes with HARQ processes. The following is an example of the rules of such scheduling.

A normal data packet is sent, for example, in the following cases:

(a) a case where no retransmission packet remains in the HARQ buffer;

(b) a case where retransmission packet remains in the HAQR buffer but a transmitter has not received the ACK/NAK signal corresponding to the retransmission packet;

(c) a case where the transmitter performs early completion (halt) of HARQ transmission resulting from waiting time (latency) for a packet whose reception has failed.

In contrast to this, a coded data packet is sent in a case where, for example, a retransmission packet is present in the HARQ buffer and the transmitter has received the NAK signal corresponding to the retransmission packet.

The format of a normal data pack is the same as that of a previous technique. In contrast to this, the format of the coded data packet depends on a coding scheme and effects a coding operation.

Here, in order to explain the HARQ operation without impairment of the possibility of generalization, it is assumed that "1" is given as the number UE, and that "4" is given as the number of HARQ channels. FIG. 1 shows an example of a synchronized HARQ flow with operative coding.

In the HARQ transmission flow exemplified in FIG. 1, the packet #1 is sent from the transmitter 10 to the receiver 50 (for example, UE) in the first slot (TTI), and subsequently, the NAK corresponding to the transmission is sent from the receiver 50 to the transmitter 10. Then, on the transmitter 10, an initial retransmission opportunity comes up for a packet #1 in the fifth slot (TTI) after four slots (TTI) (N=4).

Here, the normal packet #5 sent to the receiver 50 with the fifth slot is subjected to an XOR operation (hereinafter, will be also called "XOR") with a part (or all) of the transmission packet #1 that has received the NAK. In this instance, a part (or all) of the retransmission packet #1 subjected to an XOR operation with the normal packet #5 is obtained by multiplying the retransmission packet #1 by a predetermined binary row (pattern) expressed by the diagonal matrix Ai.

That is, the data amount of a retransmission packet subjected to an XOR operation with a normal packet is controlled by means of multiplying the retransmission packet by the above mentioned binary row adaptively controlled based on information in a logical channel (HARQ channel) through which a packet is sent.

The above mentioned data packet after being subjected to the XOR operation is sent from a transmitter 10 to the receiver 50 with the fifth slot (TTI). In this instance, in a case where retransmission of the packet #1 is unnecessary, the normal data packet #5 is sent as it is with the fifth slot (TTI). These transmission packets can be expressed by the following formula (3).

$$T_{k,i} = \begin{cases} A_i \cdot S_{k-N \cdot i, i} \oplus S_{k,0} & \text{when retransmission packet is present} \\ S_{k,0} & \text{when retransmission packet is not present} \end{cases} \quad (3)$$

where k=5, and i=1.

In accordance with the synchronized HARQ, in a case where the packet #1 is not correctly received or decoded by the operative coding, which will be detailed later, in the receiver 50 once again, another retransmission opportunity comes up for the transmitter 10 at the 9th slot (TTI) after four slots (TTI).

Therefore, in the 9th slot (TTI), the transmitter 10 performs XOR coding of the retransmission packet #1 and a part (or all) of the packet #1 which is obtained by multiplying the retransmission packet #1 by the diagonal matrix Ai, and then sends the result to the receiver 50. In this instance, when the retransmission is unnecessary, a normal data packet #9 is sent as it is with the 9th slot (TTI). These transmission packets can also be expressed by the above formula (2). Here, in this case, k=9 and i=2.

Further, the receiver 50 sends NAK with respect to the normal packet #5 in a case where the receiver 50 fails in reception and decoding of the normal packet #5 subjected to XOR coding with the retransmission packet #1. That is, the receiver 50 sends ACK/NACK to the transmitter 10 with respect to the normal packet combined by XOR coding and the retransmission packet.

In a case of receiving NAK with respect to the normal packet #5, the transmitter 10 comes up a retransmission opportunity at the 13th slot (TTI) after further four slots (TTI). Therefore, the normal packet #13 and a part (or all) of the retransmission packet #5, which is obtained as a result of multiplication between the retransmission packet #5 and the diagonal row Ai together, are subjected to XOR coding, and the thus obtained result is sent to the receiver 50. In a case where retransmission is unnecessary, the normal packet #13 is sent as it is with the 13th slot (TTI). These transmission packets can also be expressed by the above formula (2). Here, k=13 and i=1.

The above described cooperative coding processing is repeated until the receiver 50 successes in reception of the packet #1 (sends back), or until the number of times of retransmission reaches a predetermined maximum retransmission value, or until the reception BLER does not improve any more.

Figure 2:
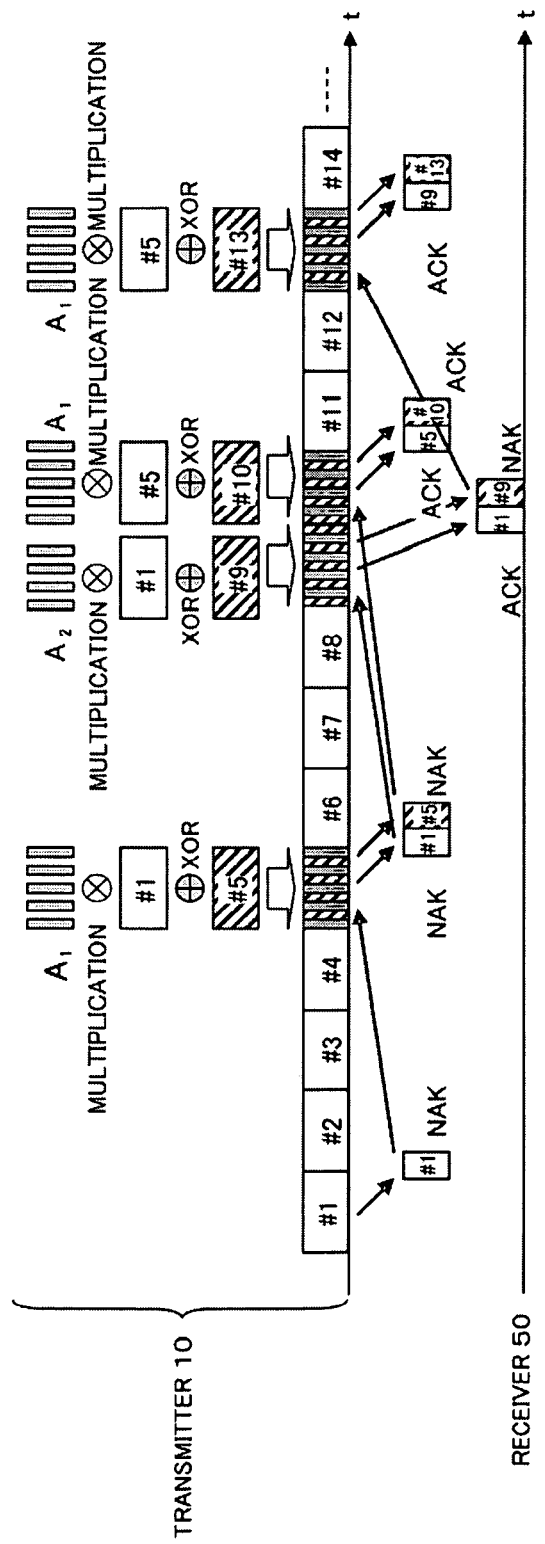
FIG. 2 is a diagram illustrating an example of an HARQ transmission flow in a case of unsynchronized HARQ according to one embodiment.

Next, FIG. 2 exemplifies an HARQ transmission flow in a case of unsynchronized HARQ. In a case of the unsynchronized HARQ, the retransmission packet can be subjected to XOR coding with a normal packet at an arbitrary slot (TTI) if the corresponding NAK is received. FIG. 2 exemplifies an example of a manner in which the successive two slots (TTI) #9 and #10 and a part (or all) of the retransmission packets #1 and #5 are subjected to XOR coding and then sent out.

Figure 3:
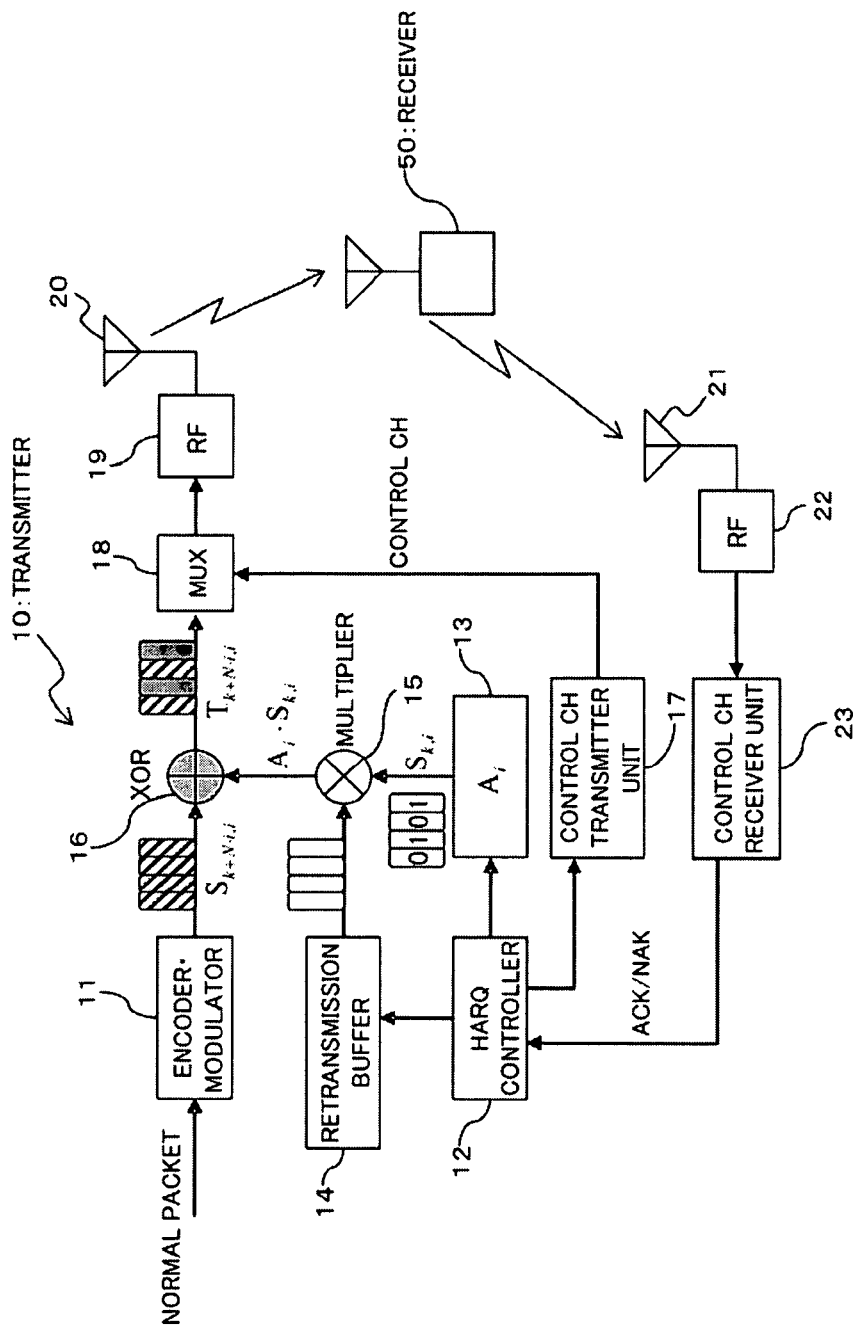
FIG. 3 is a block diagram illustrating an example of a construction of a transmitter in accordance with the first embodiment.

FIG. 3 exemplifies a construction example of a transmitter that performs the above described HARQ transmission.

The transmitter 10 depicted in FIG. 3, as an example, includes: a coder/modulator 11; an HARQ controller 12; an Ai memory 13; a retransmission buffer 14; a multiplier 15; an XOR operator 16; a control channel (CH) transmitter 17; a multiplexer (MUX) 18; an RF unit 19; and a transmitter antenna 20. Further, this transmitter 10 also includes, as an example of a reception system: a receiver antenna 21; an RF unit 22; and a control channel (CH) receiver 23.

Note that the receive antenna for control channel reception should be the same as that for data. In general, the same physical antenna ports are used for both receptions. Thus, perhaps, it may be 21=20.

The coder/modulator 11 codes and modulates a normal packet to be sent toward the receiver 50.

The Ai memory 13 holds therein the already described N×N diagonal matrix Ai.

The retransmission buffer (HARQ buffer) 14 holds a packet which has already been sent in case of its retransmission.

The HARQ controller 12 controls writing and reading of a packet to and from the retransmission buffer 14, and also controls writing and reading of the diagonal Ai to and from the Ai memory 13. In this instance, if all the entries ai(n) of the diagonal matrix Ai are controlled to take a value of 0, all the components of the retransmission packet subjected to an XOR operation with a normal packet in the XOR operator 16 take a value of 0, so that the normal packet is sent out as it is (without including a retransmission packet component).

Under control by the HARQ controller 12, the multiplier 15 multiplies the retransmission packet read from the retransmission buffer 14 and the diagonal row Ai read from the Ai memory 13 together.

The XOR operator 16 performs an XOR operation (XOR coding) between the normal packet coded and modulated by the coder/modulator 11 and a part (or all) of the retransmission packet, which is obtained as a result of multiplication performed by the multiplier 15. In this instance, it is possible to use a logical operation (multiplication or addition) equivalent to the XOR operation in place of the XOR operation.

The XOR operation between the normal packet and the transmission packet can eliminate the necessity of individual HARQ channels in transmission of the retransmission packets. This makes it possible to improve the data throughput from the transmitter 10 to the receiver 50. Further, it is also possible to improve the usability of HARQ channel resources.

The control channel transmitter (recognition information transmitter) 17 codes and modulates a signal (control signal), which is generated by the HARQ controller 12 of the control channel destined to the receiver 50. As described later, the control signal includes information for identifying a transmission packet condition (the presence or the absence of XOR coding).

The multiplexer 18 multiplexes an operation result obtained by the XOR operator 16 and a control signal from the control channel transmitter 17.

The RF unit 19 performs radio transmission processing, such as DA conversion, frequency conversion (up-conversion) to a radio frequency, and power amplification to a predetermined transmission power, and then sends the thus obtained result from the transmitter antenna 20.

The above described multiplexer 18, RF unit 19, and transmitter antenna 20 are used as an example of a transmitter unit which sends a packet having been subjected to XOR coding performed by the XOR operator 16.

The receiver antenna 21 receives a radio signal sent from the receiver 50.

The RF unit 22 performs predetermined radio reception processing, such as low-noise amplification, frequency conversion (down-conversion) to a baseband signal, and AD conversion.

The control channel receiver 23 demodulates and decodes a reception signal having been subjected to the above mentioned radio reception processing performed by the RF unit 22, thereby detecting a signal (control signal) of the control channel. This control signal includes a confirmation response (ACK/NAK signal) indicating the presence and the absence of a reception error in the receiver 50. The thus detected control signal is given to the HARQ controller 12. In this manner, the HARQ controller 12 controls the entry ai (n) of the diagonal matrix Ai for use in the above mentioned XOR coding in accordance with the ACK/NAK signal from the receiver 50.

(2.2.1) Design of HARQ Sequence

In the HARQ scheme with operative coding in the present example, a certain parameter performs an important role. That is an HARQ sequence which is arithmetically formulated by the diagonal matrix Ai and to which a high-level signaling channel is regulated.

The above formula (2) determines the diagonal matrix Ai in the i-th transmission. In the formula (2), the entry ai (n) of the diagonal matrix Ai depends on the index i in retransmission, and take a value of 0 or 1. That is, ai(n)={0, 1}. At the initial transmission in a case where i=0, all the entries of the diagonal matrix A0 can be set to "0". That is, the diagonal matrix Ai becomes a zero matrix.

However, in transmission in a case where i≠0, the number of entries taking a value of 0 in the diagonal matrix Ai depends on a ratio of the number of retransmission packets to the number of normal packets. The data packet (retransmission packet) whose reception by the receiver 50 has failed is subjected to an XOR operation with a normal packet partially (or totally) in accordance with the ratio μ, which XOR operation is performed on the XOR operator 16. In this case, the entry ai (n)=1 of the diagonal matrix Ai is repeated at 1/μ (integer number) intervals as expressed by the following formula (4).

$$a_i(n) = \begin{cases} 1 & \text{if } (n+i-1) \bmod (1/\mu) = 0 \\ 0 & \text{if } (n+i-1) \bmod (1/\mu) \neq 0 \end{cases} \quad (4)$$

The following table 1 indicates an example of the entry ai (n) in a case where the above mentioned ratio μ=0.25.

TABLE 1

| | \multicolumn{11}{c|}{n} |
|---|---|---|---|---|---|---|---|---|---|---|---|
| | 0 | 1 | 2 | 3 | 4 | 5 | --- | N−5 | N−4 | N−3 | N−2 | N−1 |
| $a_0(n)$ | 0 | 0 | 0 | 0 | 0 | 0 | --- | 0 | 0 | 0 | 0 | 0 |
| $a_1(n)$ | 1 | 0 | 0 | 0 | 1 | 0 | --- | 0 | 1 | 0 | 0 | 0 |
| $a_2(n)$ | 0 | 1 | 0 | 0 | 0 | 1 | --- | 0 | 0 | 1 | 0 | 0 |
| $a_3(n)$ | 0 | 0 | 1 | 0 | 0 | 0 | --- | 0 | 0 | 0 | 1 | 0 |
| $a_4(n)$ | 0 | 0 | 0 | 1 | 0 | 0 | --- | 1 | 0 | 0 | 0 | 1 |

Given that the ratio μ<1, an HARQ packet is partially XOR coded, so that it is possible to improve the successful reception rate of a new packet (normal packet) on the receiver 50.

(2.2.1.1) Adaptive HARQ Sequence

The movement velocity of UE, as an example of the receiver 50, is one of the parameters that give great effects to the channel estimation. If the UE moves in high velocity, the channel variation becomes large. Generally speaking, the greater the channel variation, the higher the error rate of the retransmission packet.

When the transmitter 10 stochastically knows an error rate previously to retransmission of a packet, it is possible to set a suitable value which does not give significant damages to a normal packet that is to send the ratio μ. This means that the HARQ sequence formulated by the diagonal matrix Ai can be adaptively controlled in accordance with variations in channel value. The details thereof depend on a simulation estimation result.

Further, such an adaptive HARQ sequence is capable of being formed for multiple XOR coded packets that are successively sent for recovery of the same packet. That is, a part or the whole of one retransmission packet can be subjected to an XOR operation with multiple normal packets. One example thereof will be detailed later.

(2.2.2) XOR Decoding

For giving further description of XOR coding, it is assumed that NAK in response to the packet #k is received, and it is also assumed that the same goes for a retransmission packet.

Figure 4:
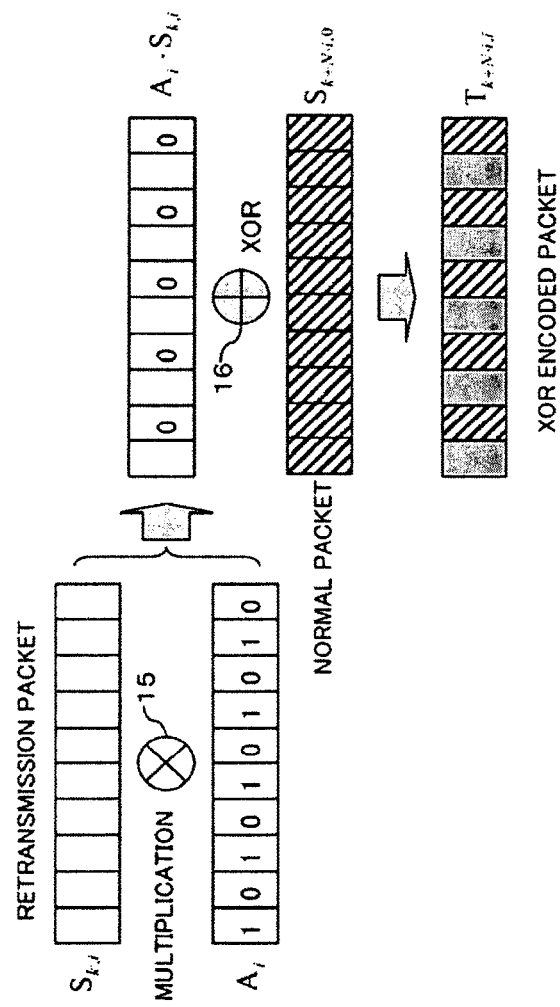
FIG. 4 is a diagram illustrating an example of a flow of a coding process with an HARQ scheme by cooperative coding performed on a transmitter exemplified in FIG. 3.

FIG. 4 indicates an example of a flow of coding processes in the HARQ scheme with cooperative coding. This FIG. 4 exemplifies a case where 50% (μ=0.5) of the packet whose reception by UE is failed and retransmitted is XOR coded with a new normal packet.

The multiplier 15 multiplies the diagonal matrix Ai by a retransmission packet (vector) Sk,i, and the retransmission data packet Ai·Sk,i can be obtained. This retransmission data packet Ai·Sk,i is XOR coded with a new normal packet Sk+n, 0 by the XOR operator 16. The thus obtained result is sent to a data channel as a transmission coded data packet Tk+N·i, i.

(2.3) HARQ Reception

For performing HARQ reception, the receiver 50 decodes a control signal, and detects whether or not the received packet is a packet obtained by the transmitter 10 by means of XOR coding of a normal packet and a retransmission packet. In a case where the received packet is not XOR coded, the received packet is decoded with normal decoding processing. In contrast to this, in a case where the received packet is XOR coded, the received packet is decoded by the processing described below.

As an example, the reception symbol vector Rk of an XOR coded packet, which is the k-th packet in the i-th transmission, can be expressed by the following formula (5):

$$Rk,i = Tk,i + \eta k,i \quad (5)$$

where Tk, i indicates a coded data packet; ηk, i expresses a reception noise vector relating to the k-th packet in the i-th transmission. ηk,i can be expressed by the following formula (6).

$$\eta k,i = (\eta k,i(0) \eta k,i(1) \ldots \eta k,i(N-1))T \quad (6)$$

Regarding to the reception symbol vector Rk, i, the decoding processing is divided into two processes. The first process is used in decoding a normal packet. At this decoding, it is possible to use already known hard bit information partially. Here, it is also possible to use soft bit information of a retransmission packet, as will be described later.

The second process is used in decoding a retransmission packet. This decoding uses bit information of the normal packet previously decoded by the first process. The processing including the first process and the second process is repetitively continued a predetermined number of times or until the BLER of each of the normal packet and the retransmission packet does not improve any more.

Figure 5:
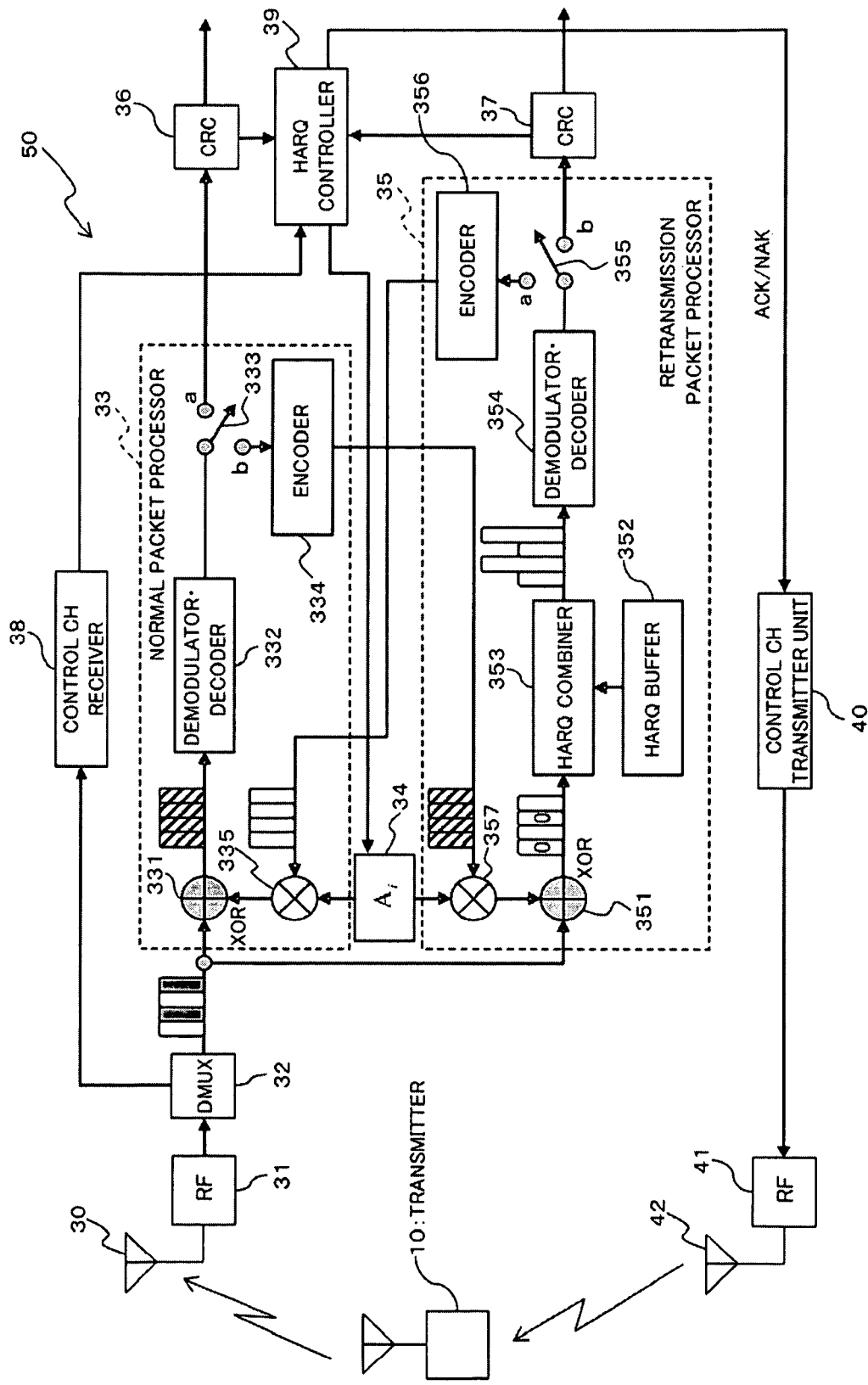
FIG. 5 is a block diagram illustrating a construction example of a receiver according to one embodiment.

FIG. 5 is a block diagram illustrating a construction example of a receiver. The receiver 50 depicted in FIG. 5 includes, for example: a receiver antenna 30; an RF unit 31; a demultiplexer (DMUX) 32; a normal packet processor 33; an Ai memory 34; and a retransmission packet processor 35. Further, this receiver 50, as an example of a transmission system, includes not only CRC operators 36 and 37, a control channel (CH) receiver 38, and an HARQ controller 39, but also a control channel (CH) transmitter 40, an RF unit 41, and a transmitter antenna 42.

Note that similar to the transmitter side, the receive antenna port is the same as the receive antenna port, i.e., 42=30.

Further, a normal packet processor (unsent data processor) 33 includes, for example: an XOR operator 331; a demodulator/decoder 332; a switch 333; a coder 334; and a multiplier 335. Further, a retransmission packet processor (retransmission data processor) 35 includes, for example: an XOR operator 351; an HARQ buffer 352; an HARQ combiner 353; a demodulator/decoder 354; a switch 355; a coder 356; and a multiplier 357.

The receiver antenna 30 receives a radio signal (normal packet and retransmission packet) sent from the transmitter 10. The received radio signal is then input to the RF unit 31.

The RF unit 31 performs predetermined radio reception processing, such as low-noise amplification, frequency conversion (down-conversion) to a baseband signal, and AD conversion, to the radio signal received by the transmitter antenna 30. The reception signal having been subjected to this radio reception processing is input to the divider 32.

The divider 32 divides the received signal into a signal (reception packet) of a data channel and a signal (control signal) of a control channel. The control signal is input to the control channel receiver 38; the signal (reception packet) of the data channel is input to the XOR operator 331 of the normal packet processor 33 and the XOR operator 351 of the retransmission packet processor 35.

The XOR operator 331 performs an XOR operation to the received signal and an output of the multiplier 335, as an example of the first operation corresponding to a logical operation executed by the XOR operator 16 of the transmitter 10. Here, the output of the multiplier 335 is a result obtained by means of multiplying the retransmission packet which has been HARQ combined, demodulated, and decoded in the past by the diagonal matrix Ai held in the Ai memory 34. Thus, an XOR operation by the XOR operator 331 makes it possible to detect a signal component of a normal packet from the received signal.

This XOR operation result (a signal component of the normal packet) is demodulated and decoded by the demodulator/decoder 332 and then output to the switch 333. The demodulation and the decoding depend on the modulation scheme and the decoding scheme used by the transmitter 10. As an example of such a modulation method, QPSK, 16 QAM, and 64 QAM can be used. As an example of such a coding scheme (decoding scheme), turbo coding (turbo decoding) or the like can be used.

The switch 333, which has output terminals a and b, selectively outputs an output signal to either one of the output terminals a and b. In the present example, such an output is coupled to the output terminal b (coder 334) repeatedly a predetermined number of times or until the BLER of the normal packet and that of the retransmission packet are not improved any more. In a case where the coupling is repeated the predetermined number of times or the BLER of the normal packet and that of the retransmission packet are not improved any more, an output of the switch 333 is switched to the output terminal a end (the demodulation and decoding result of the normal packet is output). Such switching control is performed, for example, by the HARQ controller 39.

The coder 334 generates (estimates) a signal (replica) before being decoded of the normal packet by decoding the modulation and decoding result input from the switch 333. This replica is used for detecting a retransmission packet from the received signal. For this reason, the replica is given to the multiplier 357 of the retransmission packet processor 35.

The multiplier 357 multiplies the replica by the diagonal matrix Ai held in the Ai memory 34. This multiplication corresponds to multiplication performed by the multiplexer 18 of the transmitter 10. Accordingly, this multiplication corresponds to generation of the replica of the XOR coded packet performed on the transmitter 10.

The XOR operator 351 performs an XOR operation as an example of the second operation corresponding to the logical operation, which second operation is performed by the XOR operator 16 of the transmitter 10. This makes it possible to detect a signal component of a retransmission packet from the received signal. The detected signal component is input to the HARQ combiner 353.

The HARQ combiner 353 combines (hereinafter, will also be called "HARQ combines") a signal component of the retransmission packet detected by the XOR operator 351 and the packet (a packet which falls in reception error) held in the HARQ buffer 352 together. The result of this combining is output to the demodulator/decoder 354.

The demodulator/decoder 354 demodulates and decodes a result of the HARQ combining. The modulation and decoding performed here can be equivalent to the processing used in the demodulator/decoder 332. The result of the demodulation and decoding is output to the switch 355.

Similar to the switch 333, the switch 355 has output terminals a and b, and selectively outputs the output signal of the demodulator/decoder 332 to either one of the output terminals a and b. For example, the output is coupled to the output terminal a (coder 356) end a predetermined number of times or until the BLER of the normal packet and that of the retransmission packet are not improved any more. When the number of times reaches the predetermined value or when the BLER of the normal packet and the retransmission packet is not improved any more, the output of the switch 355 is switched to the output terminal b end (the result of the demodulation and decoding of the retransmission packet is output). Such switching control is performed, for example, by the HARQ controller 39.

That is, the normal packet processors 33 and 35 repeat coding the decoding results thereof and repeatedly give the results to each other.

The coder 356 codes the output signal of the demodulator/decoder 354 input from the switch 355, and generates (estimates) the signal (replica) before being subjected to the decoding of the received retransmission packet. As already described, the replica of this retransmission packet is used for detecting a normal packet from a received signal. Thus, the replica is given to the multiplier 335 of the normal packet processor 33.

A CRC operator 36 performs a CRC operation to the normal packet which has been demodulated and decoded by demodulator/decoder 332 of the normal packet processor 33, thereby performing reception error check thereof.

Likewise, the CRC operator 37 performs a CRC operation to the retransmission packet demodulated and decoded by the demodulator/decoder 354 of the retransmission packet processor 35, thereby performing reception error check thereof.

The control channel receiver 38 demodulates and decodes the control signal separated by the divider 32 and then gives the demodulated and decoded signal to the HARQ controller 39. The control signal includes information indicating whether a packet received through the data channel is a normal packet or an XOR packet. Thus, on the basis of the HARQ controller 39 is capable of controlling the entry ai (n) of the diagonal matrix Ai for use in detection of the above described normal packet and the retransmission packet.

Further, the HARQ controller 39 generates a control signal (ACK/NAK signal) indicating the presence or the absence of a reception error (successful reception or failure in reception) for each of the reception error check results by the CRC operators 36 and 37.

The control channel transmitter (confirmation response transmitter) 40 codes and modulates a control signal (including an ACK/NAK signal) generated by the HARQ controller 39.

The RF unit 41 performs predetermined radio transmission processing, such as DA conversion, frequency conversion (up-conversion) to a radio frequency, and power amplification, to the thus coded and modulated control signal. The control signal after being subjected to this radio transmission processing is sent from the transmitter antenna 42 toward the transmitter 10 as a radio signal.

As described above, the receiver 50 of the present example repeats detection, demodulation, and decoding of a normal packet performed by the normal packet processor 33 and detection, demodulation, and decoding of a retransmission packet performed by retransmission packet processor 35 by using each other's processing results. This makes it possible to appropriately decode each of the normal packet and the retransmission packet. The above described processing is iteratively continued until the number of times of repetitions reaches a predetermined value, or until the reception BLER does not improve any more.

In this instance, the HARQ scheme with the above described cooperative coding can be selectively performed in accordance with the movement velocity of UE as an example of the receiver 50. For example, in a case where the movement velocity is lower than a predetermined velocity, the HARQ scheme with cooperative coding can be performed; in a case where the movement velocity is not lower than the predetermined velocity, a normal HARQ scheme can be applied.

To apply a normal HARQ scheme, all the entries ai(n) of the diagonal matrix Ai should be controlled so as to take a value of "0". That is, switching between the HARQ scheme with cooperative coding and a normal HARQ scheme can be realized by controlling the entries ai(n) of the diagonal matrix Ai. This selection (switching) can be performed by, for example, the HARQ controller 12.

That is, the HARQ controller 12 is used also as an example of a switching controller which selectively switches the adequacy of the XOR coding in accordance with the movement velocity of the UE 50. In this instance, the velocity of the UE 50 can be detected by the transmitter 10 based on a signal received from the UE 50, or can be notified from the UE 50 to the transmitter 10 through a control channel.

(2.3.1) Decoding Processing of Normal Packet

Figure 6:
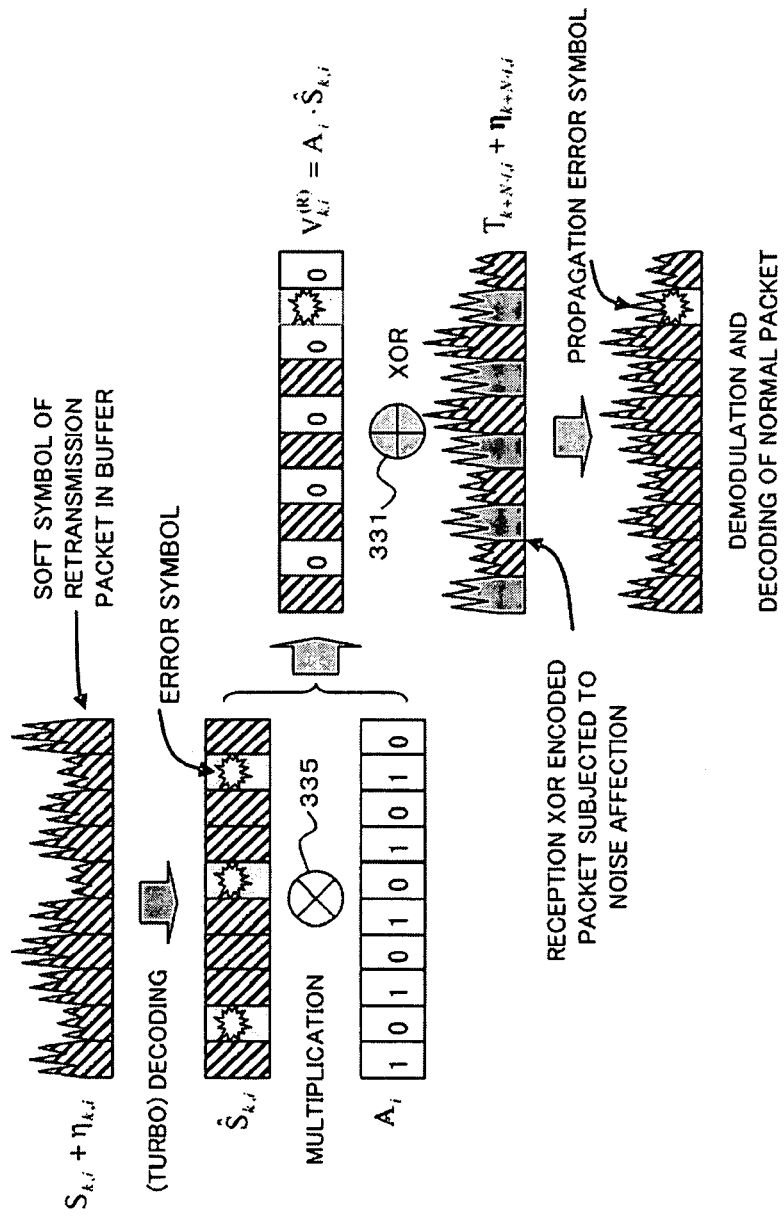
FIG. 6 is an example of a flow of decoding processing of a normal packet performed on a receiver exemplified in FIG. 5.

FIG. 6 illustrates a flow of decoding processing performed to a received normal packet with the HARQ scheme with cooperative coding.

First of all, on the receiver 50, the multiplier 335 performs multiplication of the diagonal matrix Ai of the Ai memory 34 and a data packet vector $\hat{S}_{k,i}$ (a hard bit having errors of a certain number) estimated by the coder 356 together. The vector (having a binary hard bit element) which is the result of the multiplication can be expressed by the following formula (7).

$$V_{k,i}^{(R)} = A_i \cdot \hat{S}_{k,i} \tag{7}$$

This vector partially corresponds to already known symbols in the retransmission packet expressed by the above formula (3). That is, the above data packet vector estimated by the coder 356 is multiplied by the diagonal matrix Ai, the part (symbols) corresponding to the entry ai (n)=0 being thereby masked to a value of 0. Therefore, even if an error occurs in the symbol corresponding to the entry ai (n)=0, the error symbol is masked to a value of 0. As a result, it is possible to stochastically reduce opportunities in which an error symbol is used in demodulation and decoding.

The above vector, which is a multiplication result of the multiplier 335, is given to the XOR operator 331. The XOR operator 331 performs an XOR operation of the vector and a received packet (vector). The result of the XOR operation is demodulated and decoded in the demodulator/decoder 332. Even in a case where either of the hard decision and the soft decision is used, it is yet possible to efficiently decode a normal data packet. Here, according to the present example, for the purpose of improving the system capacity, a description will be made with an attention paid to soft decision decoding.

Hard bits in a retransmission packet and a normal data packet are expressed as $$b_{k,i}^{(R)}(n,l) \text{ and } b_{k,i}^{(I)}(n,l)$$

where, i indicates the index of transmission; k indicates the index of transmission packet; n indicates the number (index) of the symbol in the packet; and l indicates the number (index) of the hard bit in the symbol.

In this case, assuming that $b_{k,i}^{(R)}(n,l)$ is already known at decoding, the log-likelihood ratio (LLR) of $b_{k,i}^{(I)}(n,l)$ can be expressed by the following formula (8).

$$LLR_{k,i}^{(I)}(n,l) \cong \begin{cases} \ln \frac{Pr(b_{k,i}^{(I)}(n,l) \oplus b_{k,i}^{(R)}(n,l) = 0)}{Pr(b_{k,i}^{(I)}(n,l) \oplus b_{k,i}^{(R)}(n,l) = 1)} & \text{if } b_{k,i}^{(R)}(n,l) = 0 \\ \ln \frac{Pr(b_{k,i}^{(I)}(n,l) \oplus b_{k,i}^{(R)}(n,l) = 1)}{Pr(b_{k,i}^{(I)}(n,l) \oplus b_{k,i}^{(R)}(n,l) = 0)} & \text{if } b_{k,i}^{(R)}(n,l) = 1 \end{cases} \tag{8}$$

Alternatively, on the basis of a proceeding retransmission symbol to which XOR decoding is performed, new symbol based constellation can be generated for decoding of individual normal packets by means of replacing the constellation of a received symbol. Thus, soft decision decoding can be realized similarly to soft decision decoding.

It is defined that the coding rate of the k-th transmission packet to which no XOR coding is performed is Ck. In this case, the following relationship is established between the number Nk(I) of information bits and the number Nk(P) of parity check bits:

$$N_k^{(D)} = N \cdot C_k$$

$$N_k^{(P)} = N \cdot (1 - C_k)$$

A coding rate at which the k-th normal packet, having been subjected to cooperative XOR coding, can be efficiently coded is given by the following formula (9):

$$\tilde{C}_{k,i} = \frac{N \cdot C_k}{N - \gamma_{k,i}^{(R)} \cdot m_{i,1}} \qquad (9)$$

where mi,1 indicates the number of entries ai(n)=0 of the diagonal matrix Ai in the i-th transmission; γk,i(R) indicates the error rate remaining in the k-th transmission data packet after the i-number of times of transmission is attempted.

The value of the efficient coding rate $\tilde{C}_{k,i}$ is appropriately controlled in such a manner that the value can be adapted to the actual channel. The remaining error rate γk,i(R) depends on a channel state and an HARQ operation point, so that it can be adjusted by controlling the mi,1 corresponding to the transmission part. The parameters mi,1 relates to a trade-off between the valid data rates of the retransmission data packet and the normal data packet.

(2.3.2) Decoding Processing of Retransmission Data Packet

Figure 7:
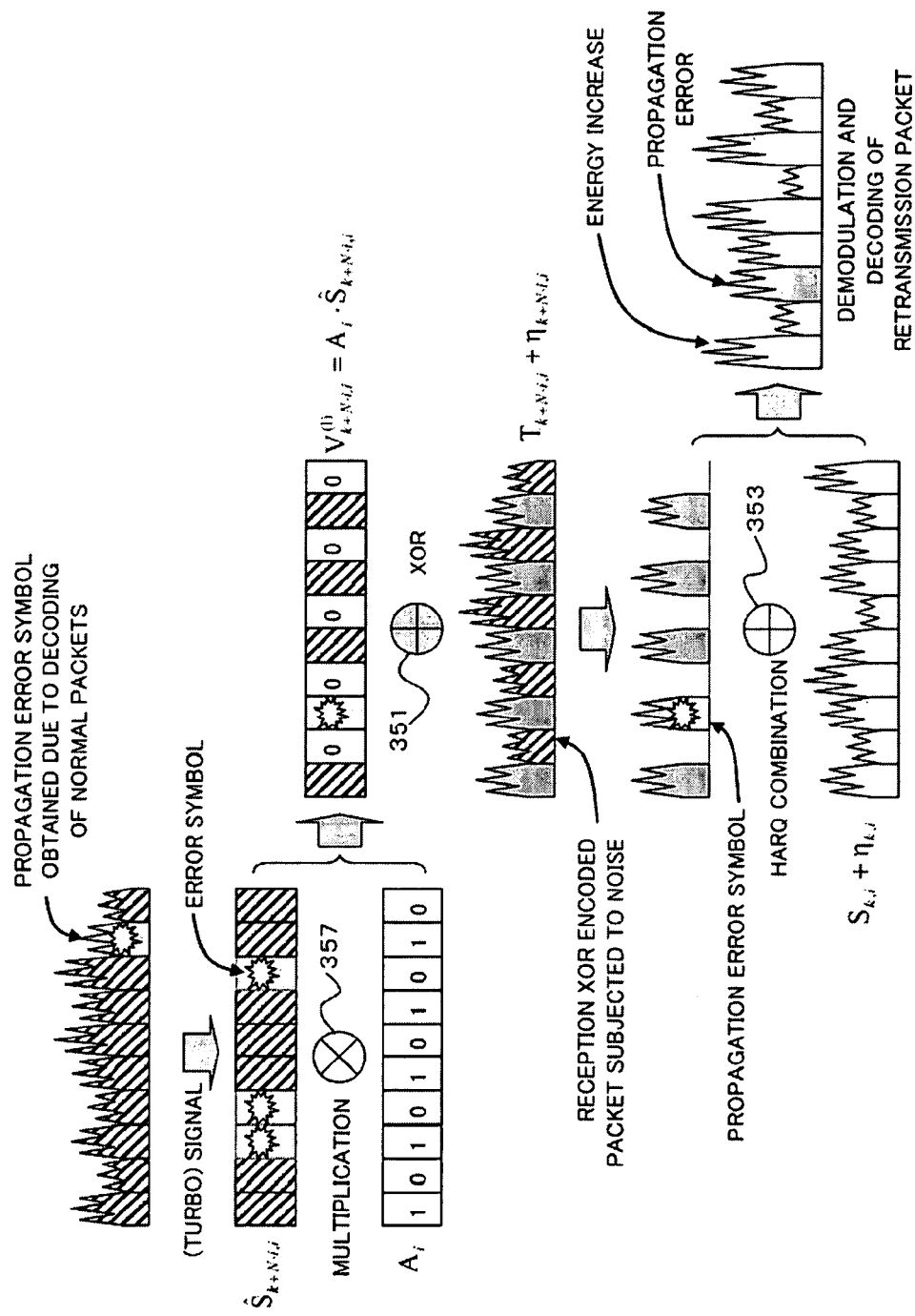
FIG. 7 is an example of a flow of decoding processing of a retransmission packet performed on the receiver exemplified in FIG. 5.

FIG. 7 exemplifies a flow of decoding processing of a received retransmission packet in the HARQ scheme with cooperative coding.

The decoding processing of the retransmission packet is similar to decoding processing of a normal packet. For example, it is assumed that the remaining data rate in the (k+N·i)-th TTI is $\gamma_{k+N \cdot i,i}^{(D)}$ and also that decoding of a normal packet is unsuccessful. On the receiver 50, the multiplier 357 multiplies the diagonal matrix Ai of the Ai memory 34 and the data packet vector $\hat{S}_{k+N \cdot i,i}$ estimated by the coder 334 together. The data packet vector having a hard bit element is expressed by the following formula (10):

$$V_{k+N \cdot i,i}^{(D)} = A_i \hat{S}_{k+N \cdot i,i} \qquad (10)$$

This vector partially corresponds to the symbol in a normal packet expressed by the formula (2), which normal packet if preciously decoded by the demodulator/decoder 332. That is, the data packet vector estimated by the coder 334 is multiplied by the diagonal matrix Ai, the part (symbol) corresponding to the entry ai(n)=0 being thereby masked to a value of 0. Thus, even if an error is generated in the symbol corresponding to the entry ai(n)=0, it is masked to the error symbol "0". As a result, it is possible to stochastically reduce opportunities in which the error symbol is used in demodulation and decoding.

The above vector, which is a multiplication result of the multiplier 357, is given to the XOR operator 351. The XOR operator 351 performs an XOR operation of the vector and the received packet (vector). The result of this XOR operation is demodulated and decoded by the demodulator/decoder 354. According to the present example, similar to the demodulator/decoder 332, soft decision decoding is used, for example.

For example, the hard bits of a retransmission packet and a normal packet are expressed as $b_{k,i}^{(R)}(n,l)$ and $b_{k,i}^{(I)}(n,l)$. In this case, assuming that $b_{k,i}^{(I)}(n,l)$ is already known at the time of decoding, the LLR of $b_{k,i}^{(R)}(n,l)$ is expressed by the following formula (11).

$$LLR_{k,i}^{(R)}(n,l) \cong \begin{cases} \ln \frac{Pr(b_{k,i}^{(R)}(n,l) \oplus b_{k,i}^{(I)}(n,l) = 0)}{Pr(b_{k,i}^{(R)}(n,l) \oplus b_{k,i}^{(I)}(n,l) = 1)} & \text{if } b_{k,i}^{(I)}(n,l) = 0 \\ \ln \frac{Pr(b_{k,i}^{(R)}(n,l) \oplus b_{k,i}^{(I)}(n,l) = 1)}{Pr(b_{k,i}^{(R)}(n,l) \oplus b_{k,i}^{(I)}(n,l) = 0)} & \text{if } b_{k,i}^{(I)}(n,l) = 1 \end{cases} \qquad (11)$$

HARQ combination after transmission of the I-number of retransmission packets can also be performed with either one of the IR scheme and the CC scheme. As to the IR scheme, there is not a significant difference between a normal HARQ scheme and the HARQ scheme with cooperative coding according to the present example.

In contrast to this, as to the CC scheme, it differs from a normal HARQ scheme in that soft gain combination is performed based on LLR. As will be described later in item [6], in the HARQ scheme with cooperative coding by the CC scheme, the combination LLR, which serves as a soft value between a normal packet and a retransmission packet, is capable of being calculated by adopting a weight vector deriving from noise power level.

[3] Design of Control Channel

In the N channel halt/waiting based HARQ, an ACK/NAK signal is sent from the receiver 50 to the transmitter 10 through a link channel (for example, control channel). The ACK/NAK signal, which is capable of being sent for each received transport block (TB), is information whether or not each TB is under a state of reception error. This information, for example, can be given as 1-bit information: "0" indicates ACK (successful reception); "1" indicates NAK (failure in reception).

The HARQ protocol using the XOR coding of the present example is capable of using two additional information items. Thus, according to the present example, the signal of the HARQ control channel includes the following three types of information items (for example, each item is one bit).

a) The first information (bit-1-CH), which is used in a confirmation response (ACK/NAK) of a normal packet flow, is sent from the receiver 50 to the transmitter 10.

B) The second information (bit-2-CH), which is used in a confirmation response (ACK/NAK) of a retransmission packet flow, is sent from the receiver 50 to the transmitter 10 as information for a new definition. This information is capable of being sent for each of the M-number (M is an integer not smaller than "1") of XOR coded packet. Normally, a setting of M=1 is given, but alternatively, a setting of M≠1 can be made for reducing the number of bits of the control channel.

C) The third information (bit-3-CH), which is used for indicating a state of transmission packet (the present or the absence of XOR coding), is sent from the receiver 50 to the transmitter 10 as information for a new definition.

Figure 8:
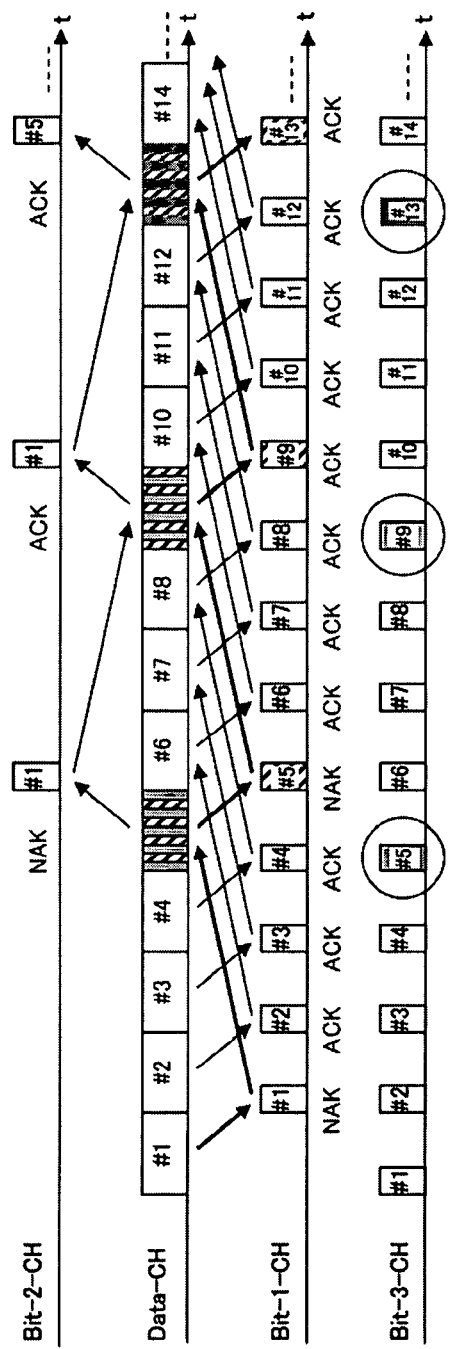
FIG. 8 is a diagram illustrating an example of a signal of a control channel according to one embodiment (M =1)
Figure 9:
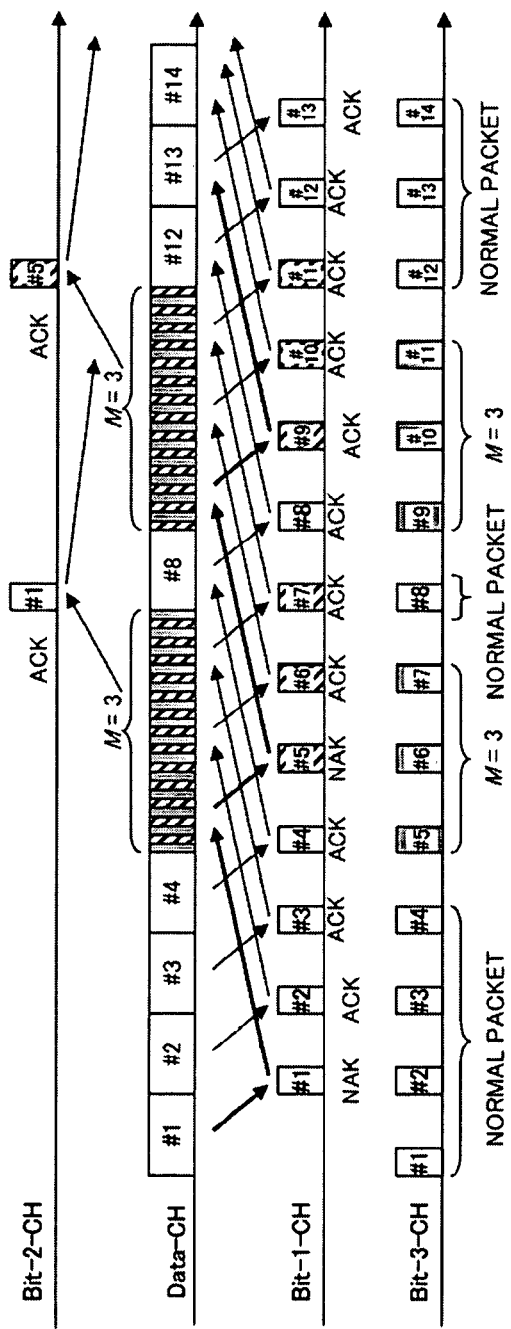
FIG. 9 is a diagram illustrating an example of a signal of a control channel according to one embodiment (M =3)

FIG. 8 exemplifies a control channel flow of the XOR coding HARQ in a case where M=1; FIG. 9 exemplifies a control channel flow of the XOR coding HARQ in a case where M=3.

FIG. 8 also exemplifies a state in which the packets #5, #9, and #13, which are sent by the 5th, 9th, and 13th slots (TTI), respectively, are XOR coded on the transmitter 10 and then sent to the receiver 50.

On the other hand, FIG. 9 exemplifies a state in which the normal packets #5, #6, and #7 sent with subsequent slots (TTI) of the number of M =3, and the retransmission packet #1 are XOR coded by the transmitter 10, and likewise, the normal packets #9, #10, and #11, and the retransmission packets #1 and #5 are XOR coded by the transmitter 10, and then the thus XOR coded packets are sent to the receiver 50.

The behavior of the above mentioned bit-1-CH, bit-2-CH, bit-3-CH can be summarized as follows.

a) Bit-1-CH: upon reception of a normal packet, the receiver 50 sends back the bit-1-CH, as a confirmation response to the normal packet, to the transmitter 10 even if the reception state is in error.

b) Bit-2-CH: upon reception of the M-number of XOR coding packets, the receiver 50 sends back the bit-2-CH, as a confirmation response to the M-number of XOR coded packets, to the transmitter 10 even if the reception state is in error. FIG. 8 illustrates an example of a case in which M=1, and the receiver 50 sends the bit-2-CH for each of the components of the retransmission packets #1, #9, and #13, included in the received XOR coded packet, to the transmitter 10. On the other hand, FIG. 9 illustrates an example of a case in which M=3, and the receiver 50 sends a single bit-2-CH for each of the components of a single retransmission packet #1 (#5), included in the received XOR coded packets of the number of M=3, to the transmitter 10.

c) Bit-3-CH: after sending a packet (a normal packet or an XOR coded packet), the transmitter 10 sends the bit-3-CH to the receiver 50. This bit-3-CH is capable of expressing, for example, that "0" means a normal packet and "1" means an XOR coded packet. Further, the bit-3-CH is capable of being sent by the same sub-frame of the data channel. In the example of FIG. 8, the bit-3-CH, indicating that each of the normal packets #5, #9, and #13 is a packet which is XOR coded with the retransmission packet. On the other hand, in the example of FIG. 9, the bit-3-CH, which indicates that a set of the three consecutive normal packets #5, #6, and #7 (or #9, #10, and #11) is XOR coded with the retransmission packet #1(or #5), is sent.

The value which M can take depends on the contents of the HARQ sequence (formulated in the diagonal matrix Ai). In the HARQ sequence, in a case where the number of "0"s in the diagonal matrix Ai is large, it is preferable to set the value of M to a large value. In contrast to this, in a case where the number of "0"s in the diagonal matrix Ai is small, it is preferable to set the value of M to a small value. The reason to do this is to increase the control channel efficiency.

In other words, the smaller the retransmission part (symbols or bits) included in the XOR coded packet sent from the transmitter 10, the larger is made the value of M. Thus, the adaptive HARQ sequence depends on both the parameters Ai and M. These parameters can be appropriately set based on a simulation evaluation result.

[4] Early Halt Processing

Early halt processing is used generally for the purpose of reducing the waiting time (latency) in HARQ. In such a representative standard as 1xEV-DO (1x Evolution Data Only), IEEE 802.16e, and LTE (Long Term Evolution), the early halt processing is performed in a case where the transmission of a retransmission packet is successfully performed before the number of times of retransmission performed reaches the upper limit of the number of times of retransmission.

As to retransmission of the XOR coded packet in the present example, it is also possible to appropriately apply the similar early halt processing. Here, since the XOR coded packet is used in the present example, the processing is not the same. Thus, in the present example, several parameters serving important roles in the early halt processing is defined as follows:

a) Bs: the number of symbols or bits in a transmission part of the XOR coded packet sent from the transmitter 10;

b) L: the number of times of retransmission performed by the transmitter 10 for restoring a retransmission packet;

c) Bmax: the maximum value of the number of symbols or the number of bits sent from the transmitter 10 for restoring the retransmission packet. This maximum value, which is statically given in the system, restricts the remaining packet error rate;

d) Dmax: the maximum value of transmission delay permissible in the system (the maximum tolerance delay)

e) Fmin: the minimum value of the buffer size in the HARQ buffer 352 which is usable for holding a retransmission packet.

Using these parameters, the early halt processing in the present example is capable of being executed with the following four methods. This early halt processing is performed by, for example, the HARQ controller 12 (or 39). That is, the HARQ controller 12 (or 39) is used also as an example of an early halt controller which restricts the number of times of transmission (reception) of a retransmission packet.

(4.1) The transmitter 10 or the receiver 50 sets the maximum number Bmax of the symbols and the bits in a retransmission part beforehand. The early halt processing occurs in a case where the number Bs·L of symbols or bits sent by the transmitter 10 is not smaller than the above mentioned maximum value Bmax. As to the early halt processing of this type, there is a possibility of an occurrence of unexpected transmission delay, for example, when the number of users in communications in a sector is large, but it is capable of assuring a low remaining packet error rate.

(4.2) The transmitter 10 or the receiver 50 statically sets the maximum tolerance delay Dmax beforehand. The early halt processing occurs in a case where the delay time of the whole of the system, which delay time is counted between the transmission time at which an initial data packet is sent and the current time, is not smaller than the maximum tolerance delay Dmax. From the viewpoint of the remaining packet error rate, the early halt processing of this type has a possibility of increase in discard in the ARQ process of the upper layer, but it is capable of assuring the maximum system tolerance delay.

(4.3) The transmitter 10 or the receiver 50 statically sets the minimum buffer size Fmin in the HARQ buffer 352 beforehand. The early halt processing occurs in a case where the surplus buffer size in the HARQ buffer 352 is not larger than the minimum buffer size Fmin. The early halt processing of this type is capable of preventing an overflow of the buffer size holding the retransmission packet.

(4.4) Any ones of the above described three methods are mixed together. For example, the transmitter 10 or the receiver 50 sets the maximum number of symbols (or the number of bits) Bmax, the maximum tolerance delay Dmax, and the minimum buffer size Fmin beforehand. The early halt processing occurs in a case where the condition due to these parameters is not satisfied. The early halt processing of this type is capable of assuring the maximum tolerance delay of the system, and is also capable of restricting the remaining packet error, and is further capable of preventing an overflow of the valid buffer size.

Figure 10:
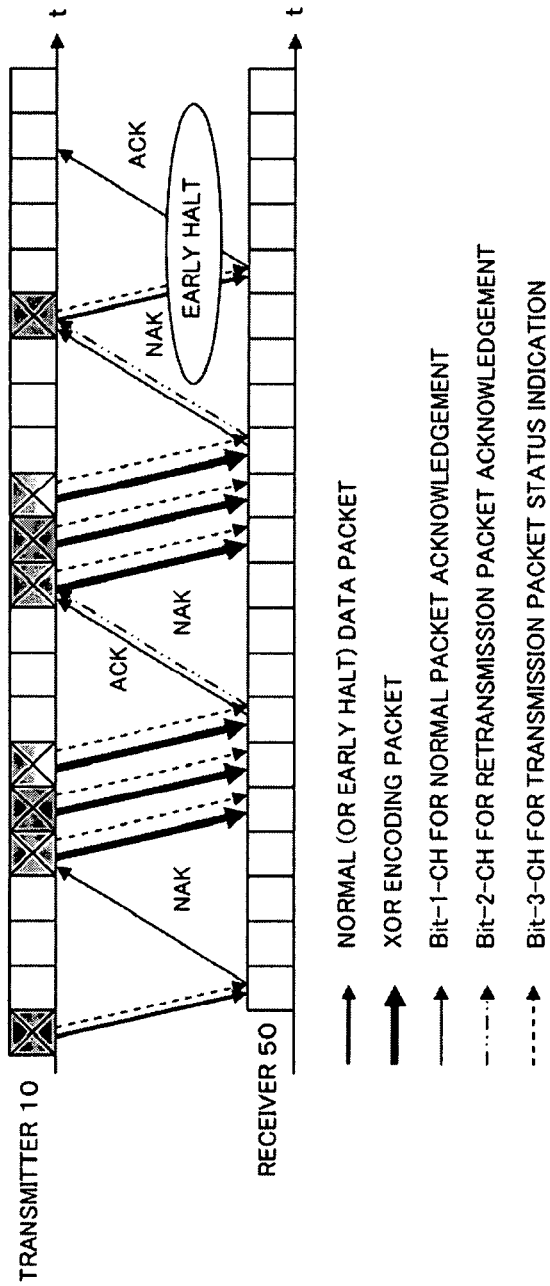
FIG. 10 is a diagram for describing early halt processing according to one embodiment.
Figure 11:
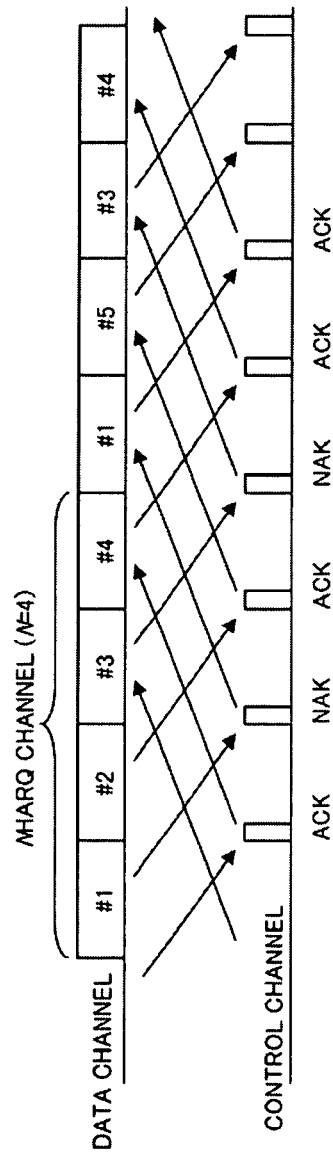
FIG. 11 is a diagram illustrating an example of HARQ processing based on a synchronized N channel halt/wait scheme in a case where N=4.
Figure 12:
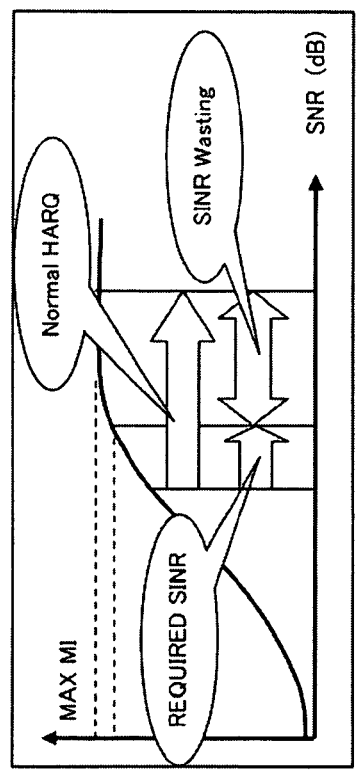
FIG. 12 is a diagram illustrating an example of a relationship between MI and SINR for a single symbol.

FIG. 10 illustrates an example of the early halt processing of the XOR coded HARQ based on the standard of the number of maximum symbols retransmitted. If the early halt processing once occurs in the transmitter 10, no additional control signal indicating a packet state is sent out. Since the packet used in the early halt processing is coped with as a new normal packet, the processing to bit-3-CH is simplified.

A recognition as to whether the subject packet is a normal packet or a packet for the early halt processing can be easily performed in accordance with the number of confirmation responses of bit-2-CH. Thus, for example, the transmitter 10 and the receiver 50 set the subject bit to a value of 0 in a case of a normal packet or an early halt packet, while they set the subject bit to 1 in a case of the XOR coded packet.

[5] Summary

The present embodiment proposes new transmission and reception methods for the HARQ system to which a cooperative coding mechanism is applied. The HARQ system proposed here totally or partially combines a new data packet and a data packet which has failed in transmission thereof and whose retransmission request is made by use of the XOR operation. These two packets can serve as the help and the benefits of each other in repetitive (repeated) decoding processing. The HARQ scheme of the present example can spectacularly improve the use efficiency of channel resources used in the HARQ processing.

[6] Others (LLR Soft Chase Combining)

In the LLR operation in HARQ with the cooperative coding scheme of the CC scheme, a weight vector based on noise power is introduced therein, which makes it possible to employ soft combination between a normal packet and a retransmission packet. Hereinafter, a detailed description thereof will be made.

It assumed that a transmission data packet is modulated with BPSK without damaging generalization, and it is also assumed that the n-th reception data symbol of the k-th packet in the i-th transmission is given as rk, i (n). In this case, the received data symbol rk,i(n) is expressed by the following formula (12):

$$r_{k,i}(n) = x_{k,i}(n) + \eta_{k,i}(n) \quad (12)$$

where xk, i (n) indicates a cooperative coded symbol of the k-th packet in the i-th transmission, which cooperative coded symbol satisfies $x_{k,i}(n) \in \{\pm 1\}$; $\eta k,i(n)$ expresses a received AWGN (Additive White Gaussian Noise) of the reference deviation σk,i [σk,i=1/(SNR) 1/2] of the k-th packet in the i-th transmission.

In a case where the cooperative coding HARQ is not used, the received signal after combining the I-number of retransmission packets (including the initial transmission in a case where i=0) is expressed by the following formula (13):

$$r_k(n) = I \cdot x_{k,0}(n) + \sum_{i=0}^{I-1} \eta_{k,i}(n) \quad (13)$$

Accordingly, the corresponding LLR value can be operated by the following formula (14):

$$LLR_k(n) = \ln \frac{Pr(r_k(n) \mid x_{k,0}(n) = +1)}{Pr(r_k(n) \mid x_{k,0}(n) = -1)} \quad (14)$$

This formula (14) can be simplified into the following formula (15):

$$LLR_k(n) = 2\left(\sum_{i=0}^{I-1} \sigma_{k,i}^2\right)^{-1} \cdot \left(I \cdot x_{k,0}(n) + \sum_{i=0}^{I-1} \eta_{k,i}(n)\right) \quad (15)$$

In contrast to this, according to the cooperative coding HARQ, the LLR of the individual packets is obtained, and the thus obtained LLR is combined by use of a noise weight vector.

The LLR corresponding to the n-th received data symbol of the k-th packet in the i-th retransmission is given by the following formula (16):

$$LLR_{k,i}(n) = \frac{2}{\sigma_{k,i}^2} \cdot [x_{k,i}(n) + \eta_{k,i}(n)] \quad (16)$$

As expressed in the following formula (17), the LLR, which is the result of the operation, is reversed in accordance with the bit of the already known symbol on the receiver before HARQ soft combination.

$$LLR_{k,i}^{(flip)}(n) = \begin{cases} LLR_{k,i}(n) & \text{when the already known symbol bit on the receiver is ``0''} \\ -LLR_{k,i}(n) & \text{when the already known symbol bit on the receiver is ``1''} \end{cases} \quad (17)$$

The LLR after being subjected to the reversion processing can be expressed by the following formula (18) by use of the already known symbol in the coded packet having been received.

$$LLR_{k,i}^{(flip)}(n) = \frac{2}{\sigma_{k,i}^2} \cdot \left[x_{k,0}(n) + \eta_{k,i}^{(flip)}(n)\right] \quad (18)$$

where ηk, I(flip) (n) expresses the noise symbol after the above reversion processing. Here, ηk,i(flip) (n) has the same reference deviation as that of σk,i.

Accordingly, the LLR of the n-th received data symbol of the k-th packet after combination of the I-number of retransmission packets thereamong, can be operated by the following formula (19):

$$LLR_k^{(C)}(n) = \sum_{i=0}^{I-1} \underbrace{\sigma_{k,i}^2 \cdot \left(\sum_{l=0}^{I-1} \sigma_{k,l}^2\right)^{-1}}_{Noise\ Weight} \cdot LLR_{k,i}^{(flip)}(n) \quad (19)$$

This formula (19) can be simplified into the following formula (20):

$$LLR_k^{(C)}(n) = 2\left(\sum_{i=0}^{I-1} \sigma_{k,i}^2\right)^{-1} \cdot \left(I \cdot x_{k,0}(n) + \sum_{i=0}^{I-1} \eta_{k,i}^{(flip)}(n)\right) \quad (20)$$

Accordingly, the statistical value of the LLR in the cooperative coding HARQ transmission is the same as that of normal HARQ transmission.

[7] Others

All the examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the gist and scope of the invention.

The invention claimed is:

1. A transmitter, comprising:
   a logical operation unit to perform a predetermined logical operation to unsent transmission data, which is sent toward a receiver, and retransmission data, which is resent toward the receiver; and
   a transmitter unit to send transmission data obtained by the logical operation to the receiver,
   wherein the unsent transmission data is subjected to the logical operation thereon with a part or all of the retransmission data, and
   an amount of unsent transmission data and an amount of the retransmission data to be subjected to the logical operation thereon are controlled by means of multiplying the retransmission data by a predetermined binary pattern.

2. The transmitter as set forth in claim 1 wherein the logical operation is an exclusive-OR operation or an equivalent operation thereto.

3. The transmitter as set forth in claim 1 wherein the retransmission data is subjected to the logical operation thereon with a plurality of items of the unsent transmission data.

4. The transmitter as set forth in claim 1 wherein the binary pattern is adaptively controlled based on logical channel information on which the transmission data is sent.

5. The transmitter as set forth in claim 1, further comprising: a recognition information transmitter unit to notify the receiver of information for identifying transmission data obtained by the logical operation.

6. The transmitter as set forth in claim 1, further comprising: an early halt controller which restricts the number of times of transmission of the retransmission data.

7. The transmitter as set forth in claim 6 wherein the early halt controller performs the restriction based on a combination of one or more of an amount of the retransmission data, a permissible transmission delay of the transmission data, a buffer size of the retransmission data.

8. The transmitter as set forth in claim 1, further comprising: a switch controller to enable or disable of the logical operation in accordance with movement velocity of the receiver.

9. A transmission method, comprising:
   performing a predetermined logical operation to unsent transmission data, which is sent toward a receiver, and a retransmission data, which is resent toward the receiver; and
   sending transmission data obtained by the logical operation to the receiver,
   wherein the unsent transmission data is subjected to the logical operation thereon with a part or all of the retransmission data, and
   an amount of unsent transmission data and an amount of the retransmission data to be subjected to the logical operation thereon are controlled by means of multiplying the retransmission data by a predetermined binary pattern.

* * * * *